US012562159B2

(12) United States Patent
Chen

(10) Patent No.: US 12,562,159 B2
(45) Date of Patent: *Feb. 24, 2026

(54) LOCALIZING AND VERIFYING UTTERANCES BY AUDIO FINGERPRINTING

(71) Applicant: Comcast Cable Communications. LLC, Philadelphia, PA (US)

(72) Inventor: Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,496

(22) Filed: Dec. 18, 2019

(65) Prior Publication Data

US 2020/0243086 A1     Jul. 30, 2020

Related U.S. Application Data

(63) Continuation of application No. 15/858,185, filed on Dec. 29, 2017, now Pat. No. 10,546,585.

(51) Int. Cl.
| | |
|---|---|
| *G10L 15/32* | (2013.01) |
| *G05B 15/02* | (2006.01) |
| *G06F 21/32* | (2013.01) |
| *G10L 15/08* | (2006.01) |

(Continued)

(52) U.S. Cl.
CPC ............. *G10L 15/22* (2013.01); *G05B 15/02* (2013.01); *G06F 21/32* (2013.01); *G10L 15/08* (2013.01);

(Continued)

(58) Field of Classification Search
CPC ......... G10L 15/22; G10L 15/08; G10L 15/30; G10L 19/018; G10L 25/51; G10L 15/088; G10L 2015/223; G10L 2015/088; G06F 21/32; G06F 3/167; G06F 3/16; G05B 15/02; H04L 12/2816; H04L 2012/2849;

(Continued)

(56) References Cited

U.S. PATENT DOCUMENTS

| | | | |
|---|---|---|---|
| 6,480,825 | B1 | 11/2002 | Sharma et al. |
| 6,671,806 | B2 | 12/2003 | Lenoir et al. |

(Continued)

FOREIGN PATENT DOCUMENTS

| | | | |
|---|---|---|---|
| WO | 2015/163774 | A1 | 10/2015 |

*Primary Examiner* — Huyen X Vo
(74) *Attorney, Agent, or Firm* — BakerHostetler

(57) ABSTRACT

Methods and systems are disclosed for enhancing the security of a user device such as a voice command device. A computing device associated with the user device may be configured to receive an indication of a trigger, such as a predetermined word or passcode. In response to receiving the indication of the trigger, the computing device may be configured to determine a verification signal marker and to cause transmission of the verification signal marker. The computing device may receive an audio input comprising a voice command and a detected signal marker and verify the voice command based on a comparison of the detected signal marker and the verification signal marker. In response to the verifying the voice command, the computing device may be configured to cause execution of an operation associated with the voice command such as tuning to a specific channel on a nearby set-top box.

43 Claims, 7 Drawing Sheets

(51) Int. Cl.

| | |
|---|---|
| *G10L 15/22* | (2006.01) |
| *G10L 15/30* | (2013.01) |
| *G10L 19/018* | (2013.01) |
| *G10L 25/51* | (2013.01) |
| *H04L 12/28* | (2006.01) |

(52) U.S. Cl.

CPC ........ *G10L 15/30* (2013.01); *G10L 2015/088* (2013.01); *G10L 2015/223* (2013.01); *G10L 19/018* (2013.01); *G10L 25/51* (2013.01); *H04L 12/2816* (2013.01)

(58) Field of Classification Search

CPC ......... H04L 12/282; H04L 12/28; H04Q 9/00; G08C 17/02; G08C 2201/60; G08C 2201/31; H04N 21/42204

See application file for complete search history.

(56) References Cited

U.S. PATENT DOCUMENTS

| | | | |
|---|---|---|---|
| 6,737,957 B1 | 5/2004 | Petrovic et al. | |
| 7,158,624 B1 * | 1/2007 | O'Toole, Jr. ........ | H04M 3/4285 379/201.1 |
| 7,921,296 B2 | 4/2011 | Haitsma et al. | |
| 8,516,562 B2 | 8/2013 | Headley | |
| 8,532,269 B2 * | 9/2013 | Chambers ............... | G10L 15/20 379/88.04 |
| 8,694,315 B1 | 4/2014 | Sheets et al. | |
| 10,192,546 B1 * | 1/2019 | Piersol ................... | G10L 15/08 |
| 10,593,328 B1 * | 3/2020 | Wang .................. | H04L 65/1059 |
| 2004/0005064 A1 * | 1/2004 | Griesinger ............ | G01V 1/001 381/17 |
| 2004/0091111 A1 | 5/2004 | Levy et al. | |
| 2005/0165609 A1 * | 7/2005 | Zuberec .................. | G10L 15/22 704/E15.04 |
| 2010/0183126 A1 * | 7/2010 | Chambers ............. | H04M 3/493 379/88.04 |
| 2014/0122059 A1 * | 5/2014 | Patel ...................... | G06F 16/40 704/9 |
| 2014/0244514 A1 | 8/2014 | Rodriguez et al. | |
| 2015/0006184 A1 | 1/2015 | Marti et al. | |
| 2015/0304785 A1 | 10/2015 | Gan et al. | |
| 2015/0379653 A1 * | 12/2015 | Neubacher .......... | G06Q 50/184 705/59 |
| 2017/0287477 A1 * | 10/2017 | Lu ........................... | H04W 4/70 |
| 2018/0182390 A1 * | 6/2018 | Hughes .................. | G10L 15/22 |
| 2019/0179611 A1 * | 6/2019 | Wojogbe ................. | H04R 3/04 |

* cited by examiner

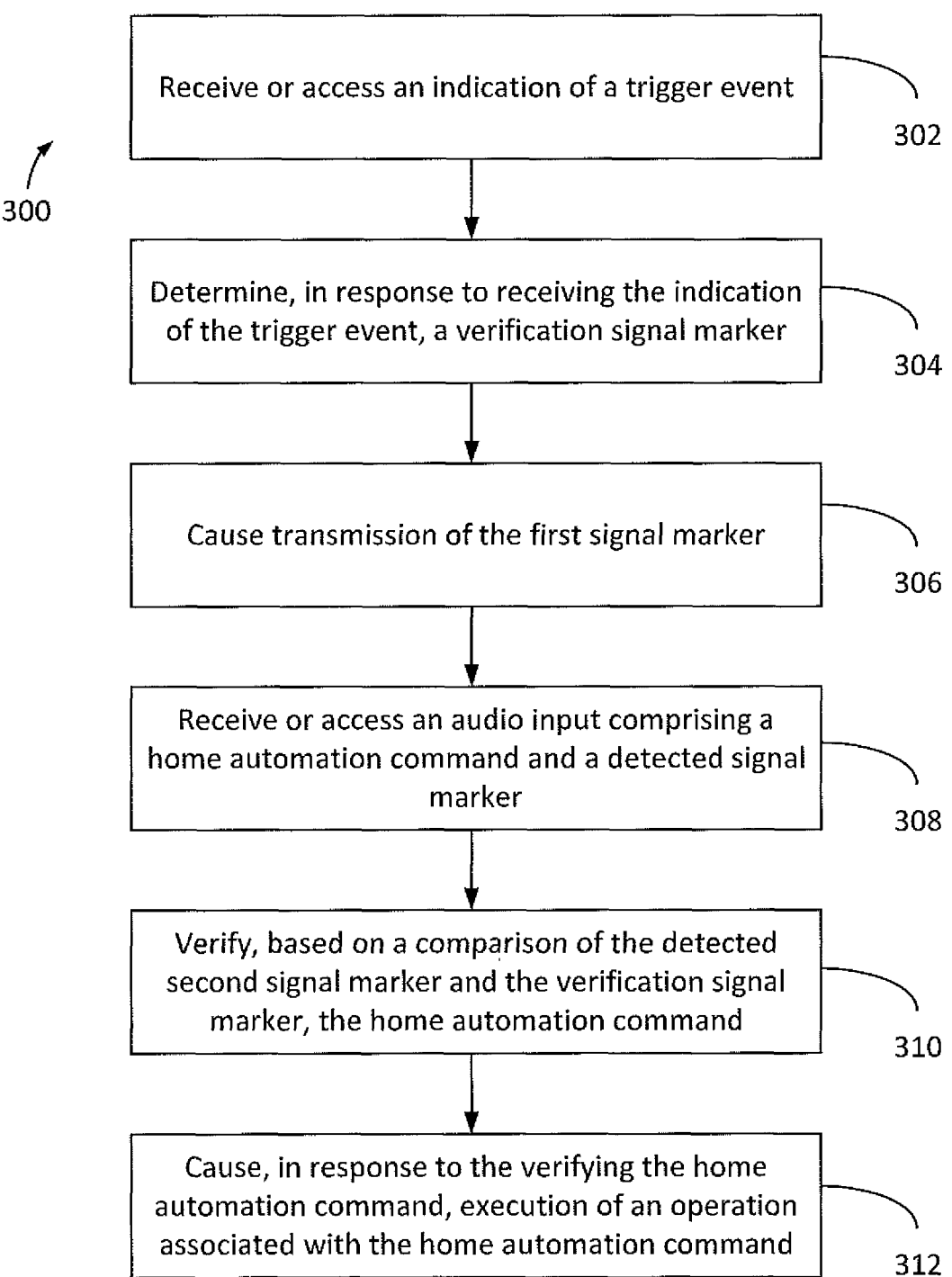

300

Receive or access an indication of a trigger event

302

Determine, in response to receiving the indication of the trigger event, a verification signal marker

304

Cause transmission of the first signal marker

306

Receive or access an audio input comprising a home automation command and a detected signal marker

308

Verify, based on a comparison of the detected second signal marker and the verification signal marker, the home automation command

310

Cause, in response to the verifying the home automation command, execution of an operation associated with the home automation command

LOCALIZING AND VERIFYING UTTERANCES BY AUDIO FINGERPRINTING

CROSS-REFERENCE TO RELATED APPLICATIONS

This application is a continuation application of U.S. patent application Ser. No. 15/858,185, filed on Dec. 29, 2017, now U.S. Pat. No. 10,546,585, issued Jan. 28, 2020, which is hereby incorporated by reference in its entirety.

BACKGROUND

Voice command devices may be controlled using audio inputs such vocal instructions or utterances from a user. By removing the need to engage buttons and other modes of touch selection, voice command devices may be operated by a human operator in a hands-free manner. Such a hands-free experience may allow the user to issue commands, while performing other tasks. As more households are equipped with voice command devices, it may be desirable to enhance the security of those voice command devices in order to prevent against threats such as replay attacks.

SUMMARY

Methods and systems are described for enhancing the security of a user device, such as, for example, a voice command device. A computing device (e.g., server) associated with the user device may be configured to receive an indication of a trigger, such as a predetermined word or passcode spoken received as an input to the user device. In response to receiving the indication of the trigger, the computing device may be configured to determine a verification signal marker (e.g., audio watermark) and to cause transmission of the verification signal marker. The computing device may be configured to receive an audio input comprising a voice command and a detected signal marker. The computing device may verify the voice command based on a comparison of the detected signal marker and the verification signal marker. In response to the verifying the voice command, the computing device may be configured to cause execution of an operation associated with the voice command. Such operations may comprise, for example, tuning to a specific channel on a nearby set-top box. However, other operations and associated voice commands may be used.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 3 is a flow chart of an example method.

DETAILED DESCRIPTION OF ILLUSTRATIVE EMBODIMENTS

Methods and systems are described for protecting a user device (e.g., a voice command device) against security threats such as replay attacks. A replay attack may occur when a trigger and/or voice command spoken by an authorized user of the device is captured by a third party and replayed at a later time, allowing the third party to interact with the device through voice commands. In order to prevent against such attacks, a computing device may receive an indication of a trigger such as a word or phrase spoken by a user in order to "activate" the user device. In response to receiving the trigger, the computing device may cause transmission of a verification signal marker by an external device, such as, for example, a set-top box located in the user's home. The computing device may further receive an audio input comprising a voice command (e.g., a home automation command) and a detected signal marker. In response to receiving the audio input, the computing device may verify the audio command based on a comparison of the verification signal marker and the detected signal marker. By verifying that the detected signal marker corresponds to the verification signal marker, the user device may determine that the voice command was generated by a user in proximity to the external device and, thus, that the voice command is not part of a replay attack. Based on this verification, the computing device may cause execution of an operation associated with the voice command by the user device.

Figure 1:
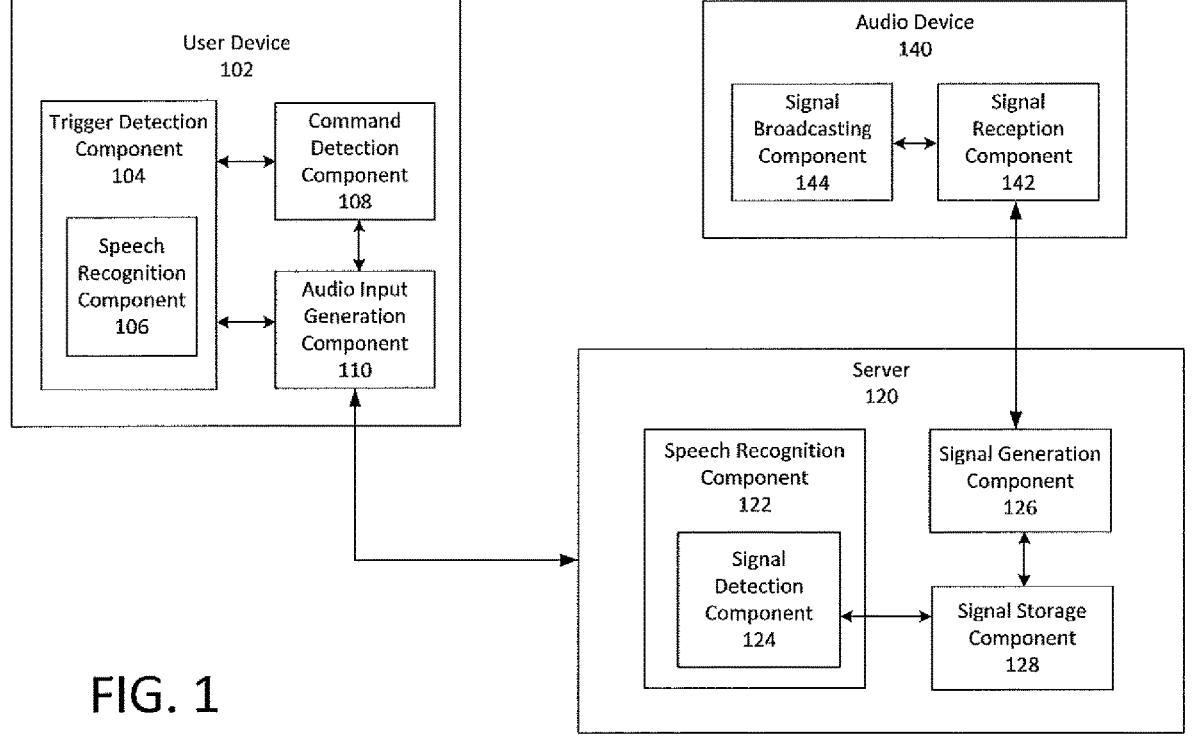
FIG. 1 is a block diagram of an example system.

An exemplary system 100 for enhancing the security of a user device 102 is shown in FIG. 1. The user device 102 may be, for example, a voice command device, such as a voice activated remote control. The user device 102 may be configured to receive an audio input comprising a trigger and/or a voice command. The trigger may be a predetermined word, phrase, or passcode spoken by a user of the user device 102. The trigger may alert the user device 102 to the presence of a voice command following the trigger, and may serve as an instruction to the device 102 to cause execution of an operation associated with the voice command following the trigger. In the example that the user device 102 is a voice activated remote control, the trigger may comprise a predetermined word, phrase or passcode recognized by the voice activated remote control, such as "remote control," in order to instruct the voice activated remote control to execute an operation associated with a command following the trigger.

The voice command may be received by the user device 102 and may instruct the device 102 to perform some operation associated with the voice command. In the example that the user device 102 is a voice activated remote control, the voice command may be an instruction for the voice activated remote control to tune the nearest set top box to a specific channel. Verification of the trigger may cause the user device to output a response based on the received voice command. Thus, a user of the device 102 may utter the phrase "remote control, tune to channel 2." The trigger may comprise the predetermined phrase "remote control" and the voice command may comprise the command "tune to channel 2." Upon verification of the trigger, the voice activated remote control may tune the nearest set-top box to channel 2.

The user device 102 may comprise a trigger detection component 104. The trigger detection component 104 may be configured to detect the occurrence of the trigger, such as the predetermined word, phrase or password spoken by a user. The user device 102 may be an "always-on" device, and detection of the trigger may cause the user device 102 to execute a command following the trigger. Additionally or alternatively, the user device 102 may be configured to enter a "sleep" mode where the user device 102 performs limited functionality, and may "wake" upon detection of the trigger. However, any words or phrases not corresponding to the trigger may be ignored by the user device 102.

The trigger detection component 104 may comprise a speech recognition component 106. The speech recognition component 106 may be configured to perform speech recognition processing in order to verify detection of the trigger. For example, the speech recognition component 106 may be configured to recognize one or more words spoken by a user of the device 102 in order to authenticate the user and to instruct the user device 102 to listen for a voice command following the verified trigger. The speech recognition component 106 may be a limited speech recognition component configured to perform simple pattern matching, as opposed to complex speech recognition such as language modeling and statistical analysis, in order to detect the occurrence of the trigger.

The user device 102 may further comprise a command detection component 108. The command detection component 108 may be configured to listen for and to record a voice command following the trigger. The voice command may be a home automation command. The command detection component 108 may be configured to capture a signal marker generated by an audio device, such as audio device 140 shown in FIG. 1. The command detection component 108 may be configured to output the received command and signal marker to audio input generation component 110. The command detection component 108 may be configured to receive, as input, an indication from the trigger detection component 104 that the trigger has been detected. In response to receiving this indication from the trigger detection component 104, the command detection component 108 may be configured to listen for and to record a voice command following the trigger.

The audio input generation component 110 may be configured to receive as input, from the trigger detection component 104, an indication that the trigger has been detected. The audio input generation component 110 may further be configured to receive as input from the command detection component 108 at least one of the voice command and a signal marker. The audio input generation component 110 may be configured to generate an audio input comprising at least the voice command and the signal marker, and to send the audio input to the server 120.

The server 120 may be configured to receive, as an input, the audio input generated by the audio input generation component 110, and may also be configured to output a generated signal marker to the audio device 140. The server 120 may comprise a speech recognition component 122. The speech recognition component 122 may be configured to receive as input the voice command from the audio input generation component 110. The speech recognition component 122 may comprise, for example, one or more of a speech capture module, a digital signal processor (DSP) module, a preprocessed signal storage module, a reference speech pattern module and a pattern matching algorithm module. Speech recognition may be done in a variety of ways and at different levels of complexity, for example, using one or more of pattern matching, pattern and feature analysis, and language modeling and statistical analysis. However, it is understood that any type of speech recognition may be used, and the examples provided herein are not intended to limit the capabilities of the speech recognition component 122.

Pattern matching may comprise recognizing each word in its entirety and employing a pattern matching algorithm to match a limited number of words with stored reference speech patterns. An example implementation of pattern patching is a computerized switchboard. For example, a person who calls a bank may encounter an automated message instructing the user to say "one" for account balance, "two" for credit card information, or "three" to speak to a customer representative. In this example, the stored reference speech patterns may comprise multiple reference speech patterns for the words "one" "two" and "three." Thus, the computer analyzing the speech may not have to do any sentence parsing or any understanding of syntax. Instead, the entire chunk of sound may be compared to similar stored patterns in the memory.

Pattern and feature analysis may comprise breaking each word into bits and recognizing the bits from key features, for example, the vowels contained in the word. For example, pattern and feature analysis may comprise digitizing the sound using an analog to digital converter (A/D converter). The digital data may then be converted into a spectrogram, which is a graph showing how the component frequencies of the sound change in intensity over time. This may be done, for example, using a Fast Fourier Transform (FFT). The spectrogram may be broken into a plurality overlapping acoustic frames. These frames may be digitally processed in various ways and analyzed to find the components of speech they contain. The components may then be compared to a phonetic dictionary, such as one found in stored patterns in the memory.

Language modeling and statistical analysis is a more sophisticated speech recognition method in which knowledge of grammar and the probability of certain words or sounds following one from another is used to speed up recognition and improve accuracy. For example, complex voice recognition systems may comprise a vocabulary of over 50,000 words. Language models may be used to give context to words, for example, by analyzing the words proceeding and following the word in order to interpret different meanings the word may have. Language modeling and statistical analysis may be used to train a speech recognition system in order to improve recognition of words based on different pronunciations. While FIG. 1 depicts a speech recognition component 106 and a speech recognition component 122, it is understood that at least part of the speech recognition process necessary to execute the voice command may be performed by a remote server.

The speech recognition component 122 may comprise a signal detection component 124. The signal detection component 124 may be configured to analyze the audio input and to detect the signal marker embedded in the voice command. The signal detection component may detect the signal maker based on a predetermined frequency of the signal marker, and the predetermined frequency of the signal marker my not overlap with the voice command. For example, the voice command may be in the frequency range of 50 to 500 Hz, while the signal marker may be outside of the audible frequency range, for example, greater than 20,000 Hz. However, it is understood that the voice command and the signal marker may be generated or received at any frequency.

The server 120 may further comprise a signal generation component 126 and a signal storage component 128. The signal generation component 126 may receive as input, from the audio input generation component 110, an indication that a trigger has been detected. In response to receipt of the indication, the signal generation component 126 may be configured to generate one or more signal markers. The signal generation component 126 may be configured to generate a verification signal marker, and to send the verification signal marker to audio device 140. The signal generation component 126 may further send this verification signal marker to the signal storage component 128. The signal storage component 128 may store the verification signal marker for comparison to a detected signal marker output by the audio device 140 in order to verify the authenticity of the voice command.

The audio device 140 may be any device capable of broadcasting one or more signal markers. The audio device 140 may be a set top box. The audio device 140 may comprise a signal reception component 142 and a signal broadcasting component 144. The signal reception component 142 may receive, from the signal generation component 126, a signal marker. The signal reception component 142 may be further configured to send the signal marker to the signal broadcasting component 144. For example, the signal reception component 142 may receive, from the signal generation component 126, a verification signal marker, and may send the verification signal marker to the signal broadcasting component 144. The signal broadcasting component 144 may be configured to output, in response to receiving the verification signal marker from the signal reception component, the verification signal marker. The signal broadcasting component 144 may be configured to output the verification signal marker during a first time period, such as the time period corresponding to receipt of the voice command.

Figure 2:
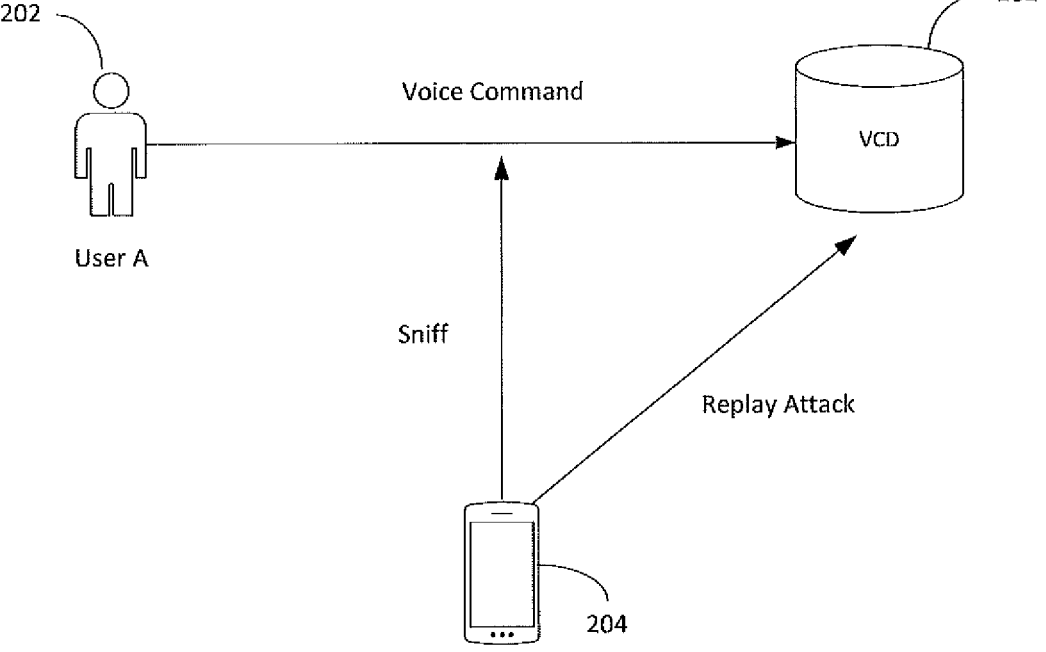
FIG. 2 is a block diagram of an example of a security threat in the form of a replay attack.

The user device 102 may be a voice command device capable of being controlled by the human voice. While voice command devices offer many advantages, such as providing information or executing commands in a hands-free manner, they also present a number of security concerns. For example, the user device 102 may be subject to replay attacks, as shown in FIG. 2. As shown in FIG. 2, User A may be configured to communicate with the user device 102 using spoken words or sounds. There may be one or more authentication procedures between User A and the user device 102 in order to prevent a third party from accessing the device and personal information associated with the user.

For example, upon first use of the device, the user device 102 may require User A to repeat a predetermined sentence multiple times to create a general template made up of the range of voice prints. When the user speaks in the future, a newly generated voice print can be matched to the stored voice prints in order to authenticate the user. The user device 102 may require that User A repeat a trigger, such as a trigger word or phrase, multiple times in order to create a template of the trigger in the user's voice. In the event that a third party attempts to access the device using the trigger word or phrase, the user device 102 may compare the spoken trigger with the template, determine that the spoken trigger does not match the template, and ignore any command spoken by the third party. Additionally or alternatively, user device 102 may be associated with a password, such as an audio password, that is unique to the user device 102 and known only to User A. Thus, without knowing the unique password, the third party may not be able to access user device 102.

However, despite these security features, as shown in FIG. 2, a third party may be able to record a spoken voice command comprising a trigger, such as a unique password spoken by a user of the user device 102. The third party may, at a later time, replay the recorded trigger in order to gain access to the user device 102. This type of recording and playing back of a trigger uttered by a verified user of the device 102 may be known as a replay attack. For example, recording device 204 associated with the third party may be configured to capture a recording of User A uttering a trigger such as "security system," followed by a voice command such as "open the front door." The recording may be played back at a later time by the third party, such as through user device 204 or another device capable of outputting the trigger, allowing the third party to gain access to User A's home. In another example, the third party may only replay the trigger and may insert their own command, for example, to purchase shoes using User A's credit card. Since the user device 102 may only verify the trigger and not the voice command itself, a third party may use the recorded trigger to attack User A in any number of ways. Security features associated with voice command devices need to be improved in order to prevent against these types of attacks.

FIG. 3 shows a flow chart for an example method 300 for enhancing the security of a user device to prevent against security threats such as replay attacks. The user device may be, for example, the user device 102 shown in FIG. 1. The method may be performed by a server, such as the server 120 shown in FIG. 1.

At step 302, an indication of a trigger may be received. The indication may be received from a user device, such as the user device 102, and may be sent in response to detection of at least one of a predetermined word or sound by the user device. For example, the trigger may comprise detection of a word or phrase spoken by a user in communication with the user device. Detection of the trigger by the user device may cause the user device to transmit an indication of the trigger to a server, such as the server 120.

At step 304, a verification signal marker may be determined in response to receiving the indication of the trigger. The verification signal marker may be used by the server in verifying the authenticity of a voice command to prevent against security threats such as replay attacks. The verification signal marker may be an audio water mark. The audio watermark may be a unique identifier embedded in an audio signal in a way that it is difficult to remove. For example, the audio watermark may be generated by an audio device, such as the audio device 140, and received by the server at the same time as the voice command. Since the voice command and the verification signal marker are received together, it may be difficult to separate the audio associated with the signal marker from audio associated with the voice command. The audio watermark may have a predetermined frequency that is different from a frequency of the voice command. For example, the voice command may be in the frequency range of 50 to 500 Hz, while the signal marker may be outside of the audible frequency range, for example, greater than 20,000 Hz.

At step 306, transmission of the verification signal marker during a first time period may be caused. Causing transmission of the verification signal marker may comprise causing transmission of the verification signal marker via a device located within a reception area of the user device, such as audio device 140 shown in FIG. 1. The first time period may correspond, for example, to a time period analogous to the voice command spoken by the user. An audio device within a reception area of the user device may be determined. In this example, causing transmission of the verification signal marker may comprise causing transmission of the verification signal marker via the determined audio device. The audio device may be a set-top box. However, it is understood that any type of audio device capable of outputting an audio signal may be used.

At step 308, an audio input comprising a voice command and a detected signal marker may be received during the first time period. The voice command may be a home automation command or a premises management command, such as a command to turn on/off a security system or to open locks in the user's home. The first time period may correspond, for example, to the time period that the voice command is spoken by the user. The detected signal marker may be, for example, an inaudible tone output by an audio device, such as audio device shown in FIG. 1. The detected signal marker may correspond to the verification signal marker output by the audio device during the first time period. The detected signal marker may be received with the voice command in a way that the detected signal marker cannot be separated from the voice command.

At step 310, the voice command may be verified based on a comparison of the detected signal marker and the verification signal marker. The server 102 may be configured to cause transmission of a verification signal marker by an audio device, such as the audio device. The audio device may output this verification signal marker at the first time period, which may be received by the server as the detected signal marker. The signal marker may be a unique, randomly generated signal marker. The randomly generated signal marker may be generated in a cryptographic manner. Additionally or alternatively, the server may store a large number of signal markers and randomly output one of the large number of signal markers so that the signal marker could not be guessed. The verification signal marker sent to the audio device 140 may be stored, for example, by the signal storage component 128. As the detected signal marker is received with the voice command, the detected signal marker may be compared to the verification signal marker in order to verify the voice command.

The detected signal marker may be distinguished from the voice command based on a predetermined frequency of the detected signal marker. The predetermined frequency of the detected signal marker may not overlap with a frequency band of the voice command. For example, the voice command may be in the frequency range of 50 to 500 Hz, while the signal marker may be outside of the audible frequency range, for example, greater than 20,000 Hz.

At step 312, in response to the verification of the voice command, the voice command may be executed. Execution of an operation associated with the voice command may comprise returning an audio response to the user by the user device. For example, if the voice command comprises the statement "what is the temperature right now," the user device may respond with the appropriate temperature, such as, for example, "the current temperature is 68 degrees." The user device may be in communication with one or more of a plurality of other devices in the user's home. In the example that the voice command comprises the phrase "tune to channel 2," the user device may send a message to the nearest set-top box in the user's home to tune to channel 2.

Figure 4:
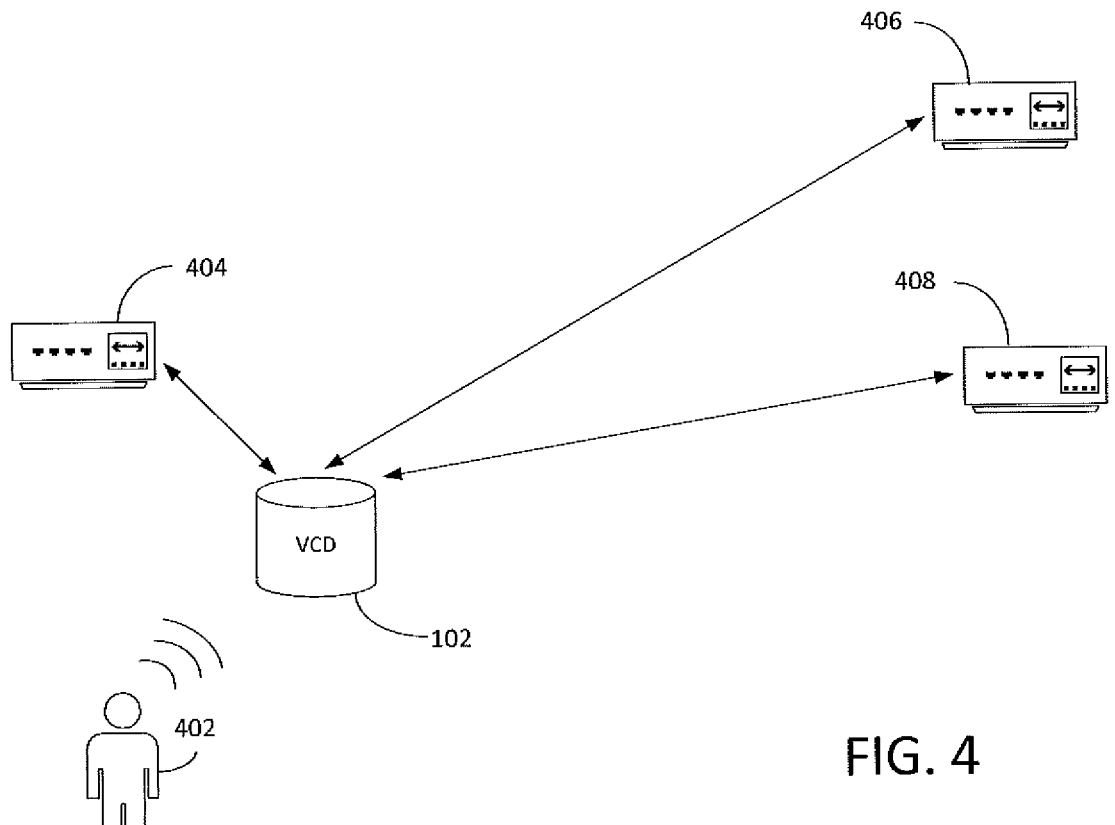
FIG. 4 is a block diagram of an example of a user device in communication with multiple audio devices.

The user device may be associated with multiple audio devices. As shown in the example of FIG. 4, the user device 102 may be in communication with audio device 404, audio device 406 and audio device 408. Each of the audio devices may be a set-top box. However, it is understood that any type of audio device capable of transmitting an audio signal can be used. Further, it is understood that each of audio device 404, audio device 406 and audio device 408 may be a different type of audio device. In the example that there are multiple audio devices in connection with the user device, there may be a need to distinguish between each of the audio devices in executing the voice command.

For example, as shown in FIG. 4, the user device may be configured to detect a trigger word or phrase from User 402. In response to detection of the trigger word or phrase, the user device may be configured to send, to the server 120, an indication of the trigger and a voice command. The voice command may be embedded with a detected signal marker. The voice command may be embedded with multiple detected signal markers, each of the detected signal markers corresponding to a given one of a plurality of audio devices. In the example that each of the audio device 402, audio device 406 and audio device 408 are set-top boxes in communication with the user device 102, and the voice command comprises the phrase "turn to channel 2," the user device 102 may not know which of the set-top boxes should respond to the command. However, the server 120 may take advantage of the plurality of detected signal markers in order to determine which of the audio devices should respond to the voice command.

For example, a plurality of audio devices within a reception area of the user device may be determined. In the example of FIG. 4, the user device may determine that audio device 404, audio device 406 and audio device 408 are all within a reception area of the user device. One or more preferred audio devices of the plurality of audio devices may be selected. In this example, causing transmission of the verification signal marker may comprise causing transmission of the verification signal marker via the selected one or more preferred audio devices. Selecting one or more preferred audio devices may be based on a location of the one or more preferred audio devices and a signal strength associated with the one or more audio devices.

Additionally or alternatively, each of the audio device 404, audio device 406 and audio device 408 may be configured to output a verification signal marker based on a request from the server. The server may then receive a voice command and a plurality of detected signal markers, each of the detected signal markers corresponding to one of audio device 404, audio device 406 and audio device 408. The server may determine which audio device should respond to the voice command based on a characteristic of the corresponding detected signal marker. For example, the server may determine which audio device should respond to the voice command based on a volume of corresponding detected signal marker. In the example of FIG. 4, the detected signal marker corresponding to audio device 404 may be the loudest as it is the closest audio device to the user device. Thus, the server may determine that since the audio device 404 is in closest proximity to the user device, the user intended that the audio device 404 carry out execution of an operation associated with the voice command. In addition, a characteristic of the voice command may be determined based on the selected one or more preferred audio devices. In the example that the voice command comprises the command "tune to channel 2," based on selecting the nearest audio device, for example, audio device 404, it may be determined that the voice command was directed towards the set-top box corresponding to audio device 440.

The user device may be configured to determine whether a received voice command is a genuine voice command. For example, the user device may be configured to determine if a voice command received at the user device is a false positive using the volume of the received voice command as an indicator. If the volume of the voice command received at the user device is below a first threshold, the user device may determine that the user is at a distance far away from the user device and that the user did not intend to utter a voice command. In contrast, if a volume of the voice command is greater than a second threshold, the user device may determine that the user is attempting to speak to somebody far away and, again, ignore the voice command based on determining that the voice command is not genuine. The user device may be configured to compare the received voice command to background noise to determine whether the voice command is genuine. For example, if the user device detects background noise (e.g., television audio) at a first volume and a human voice speaking at a second volume, the user device may be configured to ignore the utterances received from the television and to only listen for commands received from the human speaker. It is understood that the authenticity of a voice command may be determined based on factors other than volume, for example, the frequency of the received voice command.

The signal marker may be received by the user device concurrently with the trigger. The audio device 140 may be configured to output pre-selected signal markers constantly or at predetermined intervals. Thus, when the user device receives a signal marker concurrently with a trigger, the user device may use the signal marker as a means for verifying that the trigger is genuine. If the user device detects a trigger without the presence of a signal marker, the user device may be configured to ignore the trigger and any subsequent voice command.

Figure 5:
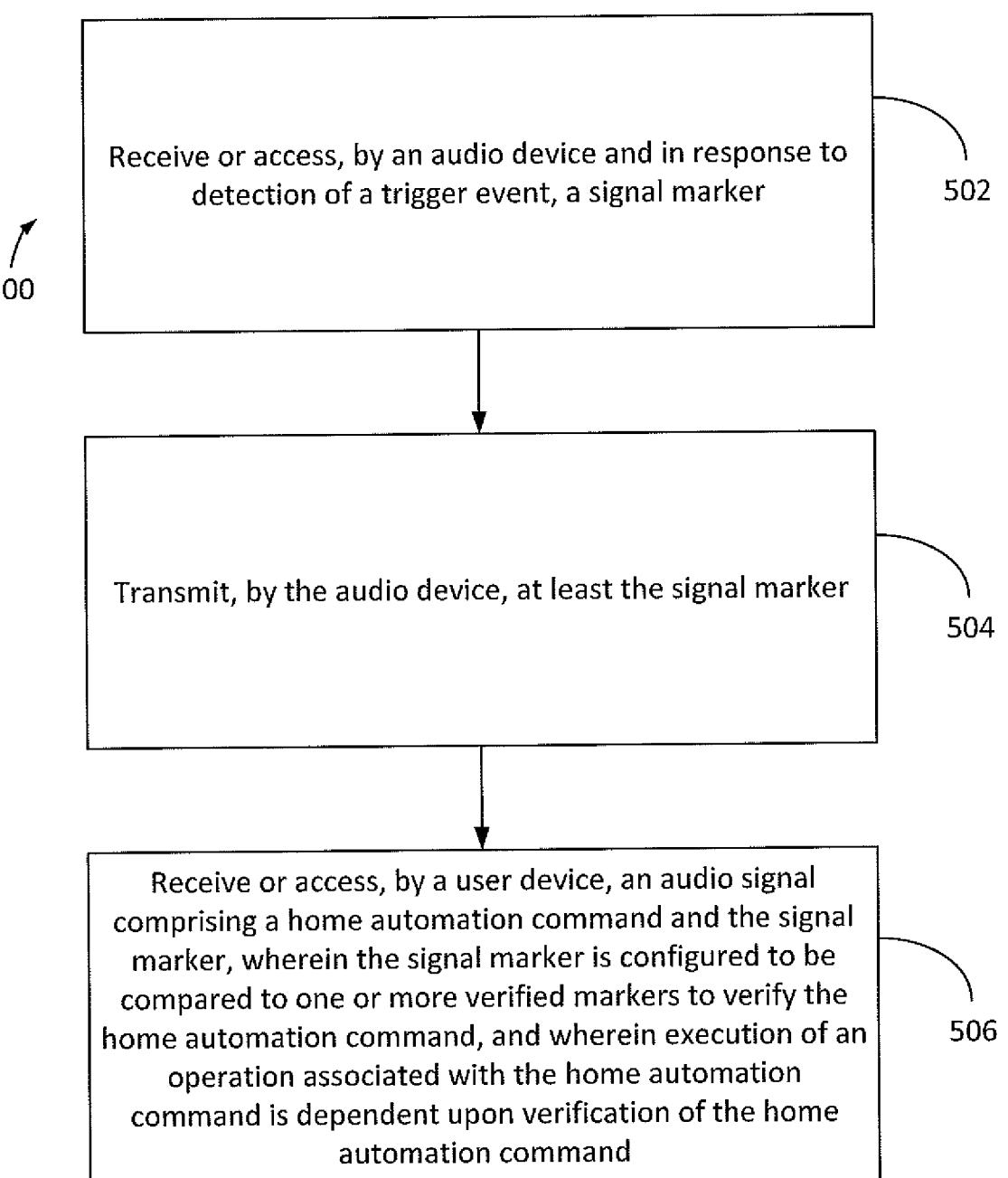
FIG. 5 is a flow chart of an example method.

FIG. 5 shows a flow chart for a method 500 for transmitting and receiving a signal marker used to verify the authenticity of a voice command. At step 502 of FIG. 5, a signal marker may be received by an audio device in response to detection of a trigger. The audio device may be, for example, audio device 140 shown in FIG. 1, such as a set-top box Receiving a signal marker may comprise receiving a verification signal marker from a server, such as the server 120. The trigger may comprise, for example, detection of a predetermined word or phrase spoken by a user of the user device 102 shown in FIG. 1. Receiving the signal marker may comprise receiving an indication to transmit the signal marker at a predetermined time.

At step 504, the signal marker may be transmitted by the audio device, such as the audio device 140. Transmitting the signal marker may comprise transmitting the signal marker at a predetermined audio frequency. The predetermined audio frequency may be outside of a frequency band of a voice command. For example, the voice command may be in the frequency range of 50 to 500 Hz, while the signal marker may be outside of the audible frequency range, for example, greater than 20,000 Hz. In the example that receiving the signal marker may comprise receiving an indication to transmit the signal marker at a predetermined time, transmitting the signal marker may comprise transmitting the signal marker at the predetermined time.

As shown at step 506, a user device may receive an audio signal comprising a voice command and the signal marker. The voice command may be a home automation command or a premises management command, such as a command to turn on/off a security system or to open locks in the user's home. The signal marker may be configured to be compared to one or more verified markers to verify the voice command, and execution of an operation associated with the voice command may be dependent upon verification of the voice command. The user device may comprise a microphone configured to receive the voice command. The audio device may receive a verification signal marker from a server, and may output this verification signal marker at a predetermined time. The server may then receive a detected signal marker at the predetermined time and my compare the detected signal marker to the stored verification signal marker to verify the authenticity of the voice command. If the detected signal marker is verified, the server may send to the user device an indication to execute the voice command.

Figure 6:
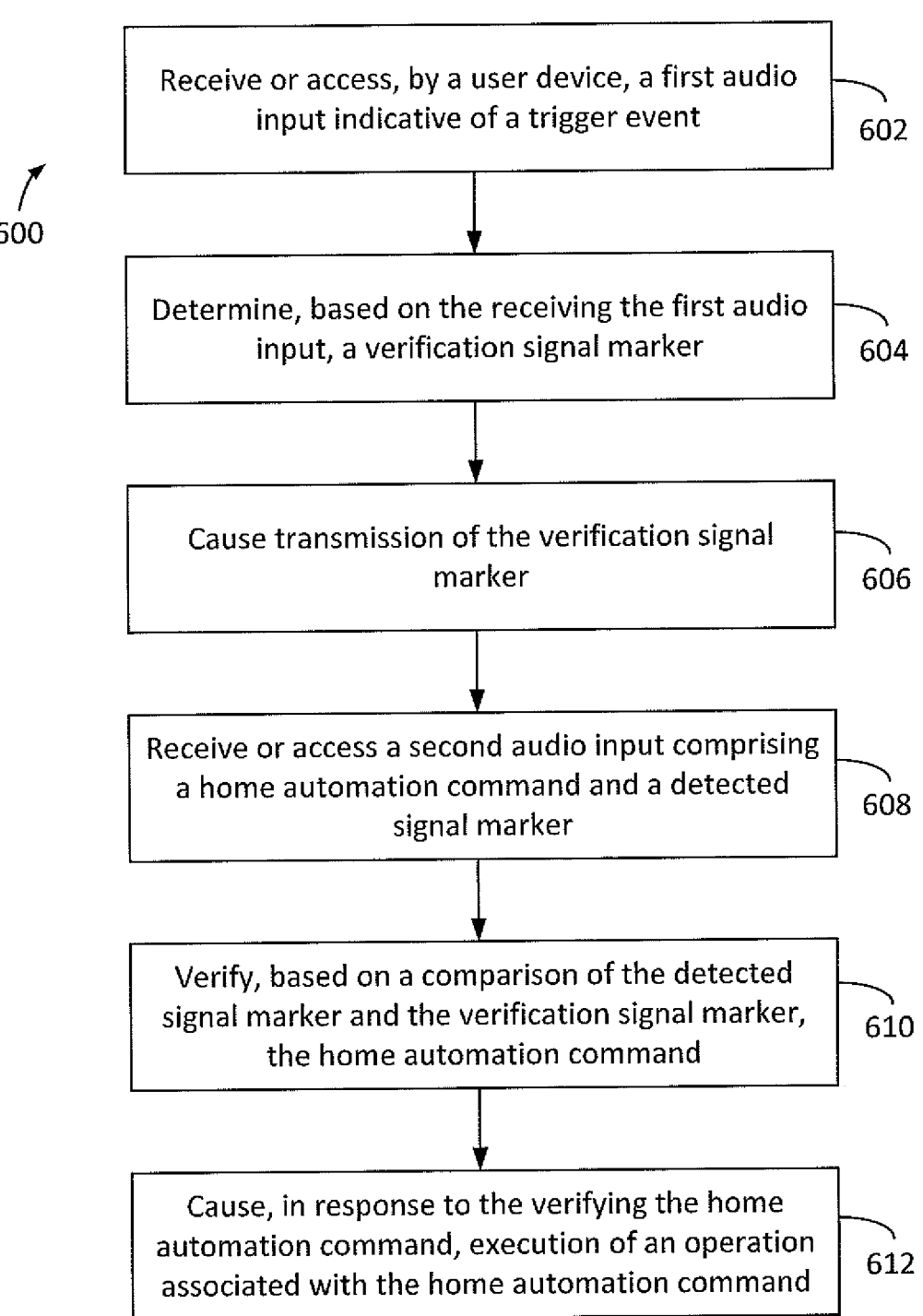
FIG. 6 is a flow chart of an example method.

FIG. 6 shows a flow chart for a method 600 for verifying the authenticity of a voice command. At step 602, a first audio input indicative of a trigger may be received by a user device, such as user device 102 shown in FIG. 1. The trigger may comprise, for example, a predetermined word or phrase spoken by the user. The user device may be an "always-on" device, and detection of the trigger may cause the user device to execute a command following the trigger. Alternatively, the user device may be configured to enter a "sleep" mode where the user device performs limited functionality, and may "wake" upon detection of the trigger. However, any words or phrases not corresponding to the trigger may be ignored by the user device. The user device may comprise a microphone configured to receive the first audio input.

At step 604, a verification signal marker may be determined based on the receiving of the first audio input. The verification signal marker may comprise, for example, an inaudible tone having a frequency greater than 20,000 Hz. The verification signal marker may comprise a random noise fingerprint. The random noise fingerprint may be a unique audio characteristic associated with the verification signal marker. For example, the random noise fingerprint may comprise a randomly selected portion of the verification signal marker that may be saved to a database. This unique portion of the verification signal marker may be used to identify the verification signal marker in the future, for example, upon receiving the detected signal marker from the audio device 140. The random noise fingerprint may comprise a sample of the verification signal marker taken at every millisecond of the generated signal. Storing this unique sample may allow the verification signal marker to be verified without the need to store the entire signal marker to memory.

At step 606, transmission of the verification signal marker during a first time period may be caused. For example, the server 120 may cause transmission of the verification signal marker by an audio device, such as the audio device 140 shown in FIG. 1. The audio device may be, for example, a set-top box. In the example that there are multiple audio devices in communication with the user device, causing transmission of the verification signal marker may comprise causing transmission of a plurality of verification signal markers, each of the plurality of verification signal markers being generated by a given one of the plurality of audio devices.

At step 608, a second audio input comprising a voice command and a detected signal marker may be received. The voice command may be a home automation command or a premises management command, such as a command to turn on/off a security system or to open locks in the user's home. The detected signal marker may be, for example, an inaudible tone output by an audio device, such as the audio device 140 shown in FIG. 1. The detected signal marker may correspond to the verification signal marker output by the audio device during the first time period. The detected signal marker may be received with the voice command in a way that the detected signal marker cannot be separated from the voice command.

The voice command may be associated with one or more of a content system and a premises management system. The content system may comprise, for example, a television system such as a television in connection with a set-top box, a computing system in communication with a modem for connecting to the Internet, or any other system capable of presenting content to a user. The content system may be associated with, for example, a cable provider, an Internet provider, or any provider of content such as movies, television shows, and other media. The premises management system may allow the user device, such as the user device, to be in communication with certain components of the user's home. For example, the user device may be connected to at least one of lights, door locks and window shades in a user's home. Communicating with the user device in connection with the premises management system may allow the user to, for example, turn on the lights, unlock the front door or close the window shades via commands spoken to the user device 102.

At step 610, the voice command may be verified based on a comparison of the detected signal marker and the verification signal marker. The server may be configured to cause transmission of a verification signal marker by an audio device, such as the audio device 140. The audio device may output this verification signal marker at the first time period, which may be received by the server as the detected signal marker. The signal marker may be a unique, randomly generated signal marker. Additionally or alternatively, the server may store a large number of signal markers and randomly output one of the large number of signal markers so that the signal marker could not be guessed. The verification signal marker sent to the audio device may be stored, for example, by the signal storage component 128. As the detected signal marker is received with the voice command, the detected signal marker may be compared to the verification signal marker in order to verify the voice command.

The detected signal marker may be distinguished from the voice command based on a predetermined frequency of the detected signal marker. The predetermined frequency of the detected signal marker may not overlap with a frequency band of the voice command. For example, the voice command may be in the frequency range of 50 to 500 Hz, while the signal marker may be outside of the audible frequency range, for example, greater than 20,000 Hz.

Verifying the voice command may comprise authenticating a source of the voice command. Upon first use of the device, user device may require a user to repeat a predetermined sentence multiple times to create a general template made up of the range of voice prints. When the user speaks in the future, a newly generated voice print can be matched to the old voice prints in order to authenticate the user. The user device may require that the user repeat a trigger multiple times in order to create a template of the trigger in the user's voice. When the user attempts to access the user device at a later time, at least one of the spoken trigger or command may be compared to the template in order to authenticate the user. In the event that a third party attempts to access the device using the trigger word or phrase, the user device may compare the spoken trigger with the template, determine that the spoken trigger does not match the template, and ignore any command spoken by the third party. Additionally or alternatively, the user device may be associated with a password, such as an audio password, that is unique to device and known only to the specific user.

Thus, without knowing the unique password, a third party may not be able to access the user device.

As shown at step 612, execution of an operation associated with the voice command may be caused in response to the verifying the voice command. Execution of an operation associated with the voice command may comprise returning an audio response to the user by the user device. For example, if the voice command comprises the statement "what is the temperature right now," the user device may respond with the appropriate temperature, such as, for example, "the current temperature is 68 degrees." In another example, the voice command may comprise the phrase "tune to channel 2," and executing the voice command may comprise sending a message to the nearest set-top box in the user's home to tune to channel 2.

Figure 7:
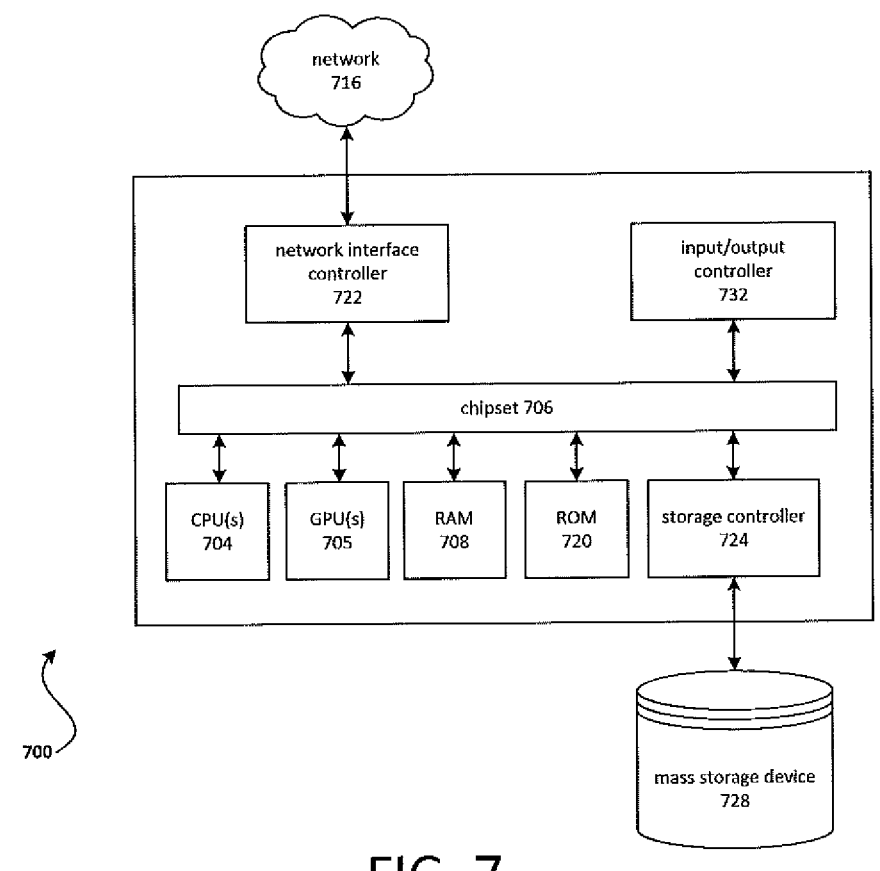
FIG. 7 is a block diagram of an example computing device.

FIG. 7 depicts a computing device that may be used in various aspects, such as the servers, modules, and/or devices depicted in FIG. 1. With regard to the example architecture of FIG. 1, the user device 102, server 120, and/or the audio device 140 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3, 5 and 6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 3, 5 and 6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks. These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:
1. A method comprising:
   receiving, by a computing device, an indication of a trigger;
   receiving, by the computing device, an audio input in response to an audio verification signal outputted via an audio device based on the indication of the trigger, wherein the audio input comprises:
      a voice command, and
      an audio signal;
   verifying, by the computing device, the voice command based on a comparison of the audio verification signal and the audio signal; and
   causing, based on the verifying the voice command, execution of an operation associated with the voice command.

2. The method of claim 1, further comprising causing output of the audio verification signal via the audio device based on detection of at least one of a predetermined word or sound by a user device.

3. The method of claim 2, wherein the audio device is located within a reception area of the user device.

4. The method of claim 1, further comprising determining an audio device within a reception area of a user device, and causing output of the audio verification signal via the determined audio device.

5. The method of claim 1, further comprising:
   determining a plurality of audio devices within a reception area of a user device;
   selecting one or more preferred audio devices of the plurality of audio devices; and
   causing output of the audio verification signal via the selected one or more preferred audio devices.

6. The method of claim 5, wherein the selecting the one or more preferred audio devices is based on at least one of a location of the one or more preferred audio devices or a signal strength associated with the one or more preferred audio devices.

7. The method of claim 5, wherein a characteristic of the voice command is determined based on the selected one or more preferred audio devices.

8. The method of claim 1, wherein the audio verification signal comprises an audio watermark.

9. The method of claim 1, further comprising distinguishing, based on a characteristic of the audio signal, the audio signal from the voice command.

10. The method of claim 9, wherein the characteristic of the audio signal comprises at least one of: a predetermined frequency, a frequency that is outside of a frequency band of the voice command, or a frequency that is outside of an audible frequency range.

11. The method of claim 1, further comprising causing output of the audio verification signal at a premises, and wherein the verifying, based on the comparison of the audio signal and the audio verification signal, ensures that the voice command is not a replay attack.

12. The method of claim 1, wherein execution of the operation associated with the voice command comprises at least one of: returning an audio response to a user, controlling a device, or controlling a component of a premises management system.

13. The method of claim 1, wherein the receiving the audio input is via a microphone of a device.

14. The method of claim 1, further comprising causing output of the audio verification signal via the audio device.

15. The method of claim 1, further comprising causing output of the audio verification signal during a first time period analogous to a time period for speaking the voice command.

16. The method of claim 1, wherein the receiving the audio input is following output of the audio verification signal.

17. The method of claim 1, wherein the audio signal comprises all or a portion of the audio verification signal.

18. An apparatus comprising:
   one or more processors; and
   memory storing instructions that, when executed by the one or more processors, cause the apparatus to:
      receive an indication of a trigger;
      receive an audio input in response to an audio verification signal outputted via an audio device based on the indication of the trigger, wherein the audio input comprises:
         a voice command, and
         an audio signal;
      verify the voice command based on a comparison of the audio verification signal and the audio signal; and
      cause, based on the verifying the voice command, execution of an operation associated with the voice command.

19. The apparatus of claim 18, wherein the instructions, when executed by the one or more processors, cause the apparatus to cause output of the audio verification signal based on detection of at least one of a predetermined word or sound by a user device.

20. The apparatus of claim 19, wherein the instructions, when executed by the one or more processors, cause the apparatus to cause output of the audio verification signal via a device located within a reception area of the user device.

21. The apparatus of claim 18, wherein the instructions, when executed by the one or more processors, further cause the apparatus to determine an audio device within a reception area of a user device, and wherein the instructions, when executed by the one or more processors, cause the apparatus to cause output of the audio verification signal via the determined audio device.

22. The apparatus of claim 18, wherein the instructions, when executed by the one or more processors, further cause the apparatus to:

determine a plurality of audio devices within a reception area of a user device; and select one or more preferred audio devices of the plurality of audio devices, and wherein the instructions, when executed by the one or more processors, cause the apparatus to cause output of the audio verification signal via the selected one or more preferred audio devices.

23. The apparatus of claim 22, wherein the instructions, when executed by the one or more processors, further cause the apparatus to select the one or more preferred audio devices based on at least one of a location of the one or more preferred audio devices or a signal strength associated with the one or more preferred audio devices.

24. The apparatus of claim 22, wherein a characteristic of the voice command is determined based on the selected one or more preferred audio devices.

25. The apparatus of claim 18, wherein the audio verification signal comprises an audio watermark.

26. The apparatus of claim 18, wherein the instructions, when executed by the one or more processors, further cause the apparatus to distinguish, based on a characteristic of the audio signal, the audio signal from the voice command.

27. The apparatus of claim 26, wherein the characteristic of the audio signal comprises at least one of: a predetermined frequency, a frequency that is outside of a frequency band of the voice command, or a frequency that is outside of an audible frequency range.

28. The apparatus of claim 18, wherein the instructions, when executed by the one or more processors, cause the apparatus to cause output of the audio verification signal at a premises, and wherein the instructions, when executed by the one or more processors, cause the apparatus to verify, based on the comparison of the audio signal and the audio verification signal, the voice command to ensure that the voice command is not a replay attack.

29. The apparatus of claim 18, wherein the instructions, when executed by the one or more processors, cause the apparatus to cause execution of the operation associated with the voice command by causing at least one of: returning an audio response to a user, controlling a device, or controlling a component of a premises management system.

30. The apparatus of claim 18, wherein the instructions, when executed by the one or more processors, cause the apparatus to receive the audio input via a microphone of a device.

31. A non-transitory computer-readable medium storing instructions that, when executed, cause:

receiving, by a computing device, an indication of a trigger;

receiving, by the computing device, an audio input in response to an audio verification signal outputted via an audio device based on the indication of the trigger, wherein the audio input comprises:

a voice command, and an audio signal;

verifying the voice command based on a comparison of the audio verification signal and the audio signal; and causing, based on the verifying the voice command, execution of an operation associated with the voice command.

32. The non-transitory computer-readable medium of claim 31, wherein the instructions, when executed, cause output of the audio verification signal based on a detection of at least one of a predetermined word or sound by a user device.

33. The non-transitory computer-readable medium of claim 32, wherein the instructions, when executed, cause output of the audio verification signal via a device located within a reception area of the user device.

34. The non-transitory computer-readable medium of claim 31, wherein the instructions, when executed, further cause determining an audio device within a reception area of a user device, and wherein the instructions, when executed, cause output of the audio verification signal via the determined audio device.

35. The non-transitory computer-readable medium of claim 31, wherein the instructions, when executed, further cause:

determining a plurality of audio devices within a reception area of a user device; and selecting one or more preferred audio devices of the plurality of audio devices, wherein the instructions, when executed, cause output of the audio verification signal via the selected one or more preferred audio devices.

36. The non-transitory computer-readable medium of claim 35, wherein the instructions, when executed, further cause selecting the one or more preferred audio devices based on at least one of a location of the one or more preferred audio devices or a signal strength associated with the one or more preferred audio devices.

37. The non-transitory computer-readable medium of claim 35, wherein a characteristic of the voice command is determined based on the selected one or more preferred audio devices.

38. The non-transitory computer-readable medium of claim 31, wherein the audio verification signal comprises an audio watermark.

39. The non-transitory computer-readable medium of claim 31, wherein the instructions, when executed, further cause distinguishing, based on a characteristic of the audio signal, the audio signal from the voice command.

40. The non-transitory computer-readable medium of claim 39, wherein the characteristic of the audio signal comprises at least one of: a predetermined frequency, a frequency that is outside of a frequency band of the voice command, or a frequency that is outside of an audible frequency range.

41. The non-transitory computer-readable medium of claim 31, wherein the instructions, when executed, cause output of the audio verification signal at a premises, and wherein the instructions, when executed, cause verifying, based on the comparison of the audio signal and the audio verification signal, to ensure that the voice command is not a replay attack.

42. The non-transitory computer-readable medium of claim 31, wherein the instructions, when executed, cause execution of the operation associated with the voice command by causing at least one of: returning an audio response to a user, controlling a device, or controlling a component of a premises management system.

43. The non-transitory computer-readable medium of claim 31, wherein the instructions, when executed, cause receiving the audio input via a microphone of a device.

* * * * *